(12) United States Patent
Kanzawa

(10) Patent No.: US 8,876,234 B2
(45) Date of Patent: Nov. 4, 2014

(54) POWER SUPPLY DEVICE, POWER SUPPLY DEVICE CONTROL METHOD, AND IMAGE FORMING APPARATUS

(75) Inventor: Tomokazu Kanzawa, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 309 days.

(21) Appl. No.: 13/409,663

(22) Filed: Mar. 1, 2012

(65) Prior Publication Data
US 2012/0229533 A1 Sep. 13, 2012

(30) Foreign Application Priority Data
Mar. 8, 2011 (JP) .................................. 2011-050685

(51) Int. Cl.
*B41J 29/38* (2006.01)

(52) U.S. Cl.
USPC ..................................... 347/5; 347/12; 347/14

(58) Field of Classification Search
USPC ................. 347/5, 9, 12, 14; 713/323
See application file for complete search history.

(56) References Cited

U.S. PATENT DOCUMENTS

| 7,108,345 B2 * | 9/2006 | Mochizuki et al. ............. 347/12 |
| 7,255,410 B2 * | 8/2007 | Masuda ............................ 347/5 |
| 7,966,507 B2 | 6/2011 | Kanzawa | |

FOREIGN PATENT DOCUMENTS

| JP | 11-143559 | 5/1999 |
| JP | 4279235 | 3/2009 |
| JP | 2010-776 | 1/2010 |

* cited by examiner

*Primary Examiner* — Lam S Nguyen
(74) *Attorney, Agent, or Firm* — Oblon, Spivak, McClelland, Maier & Neustadt, L.L.P.

(57) ABSTRACT

According to an embodiments, a power supply device includes: a first voltage generator that operates to output a first voltage; a second voltage generator that operates to output a second voltage higher than the first voltage; a third voltage generator that, from the second voltage generated by the second voltage generator, operates to generate a third voltage equal to the first voltage and to output the third voltage therefrom; and a selector that operates to select as an output whichever has a higher voltage from the output of the first generator and the output of the second generator, wherein each of the output of the second voltage generator and the output selected by the selector are supplied to a load.

8 Claims, 8 Drawing Sheets

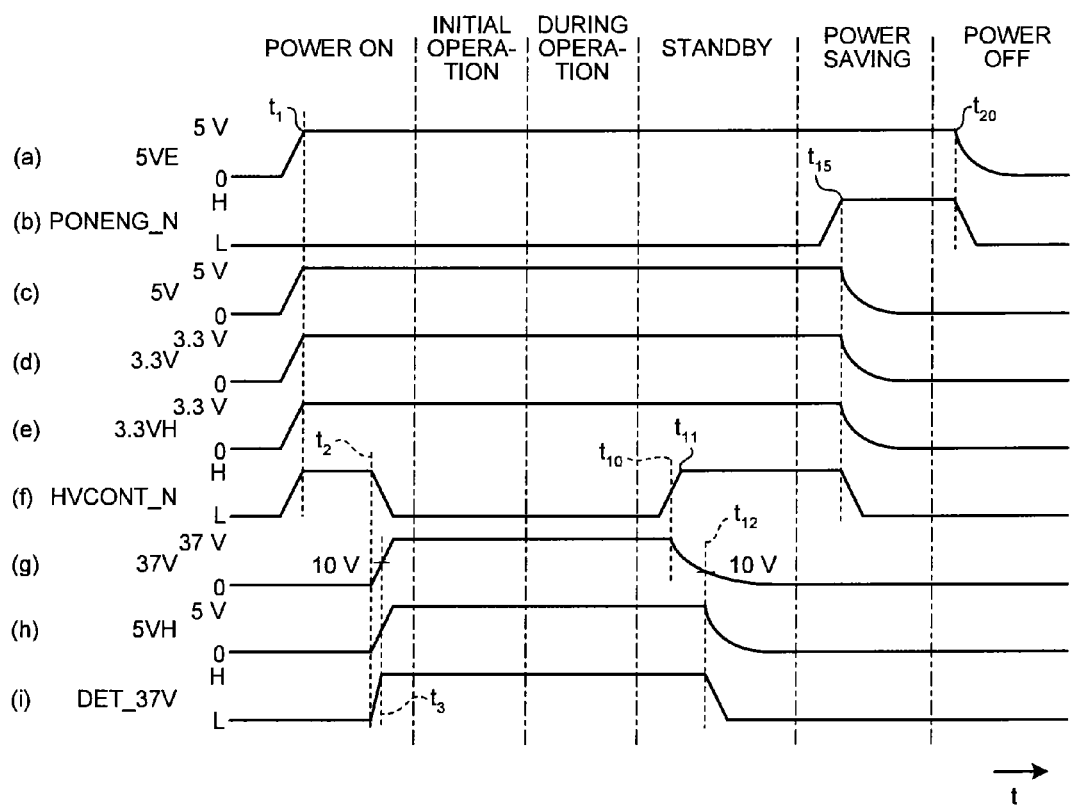

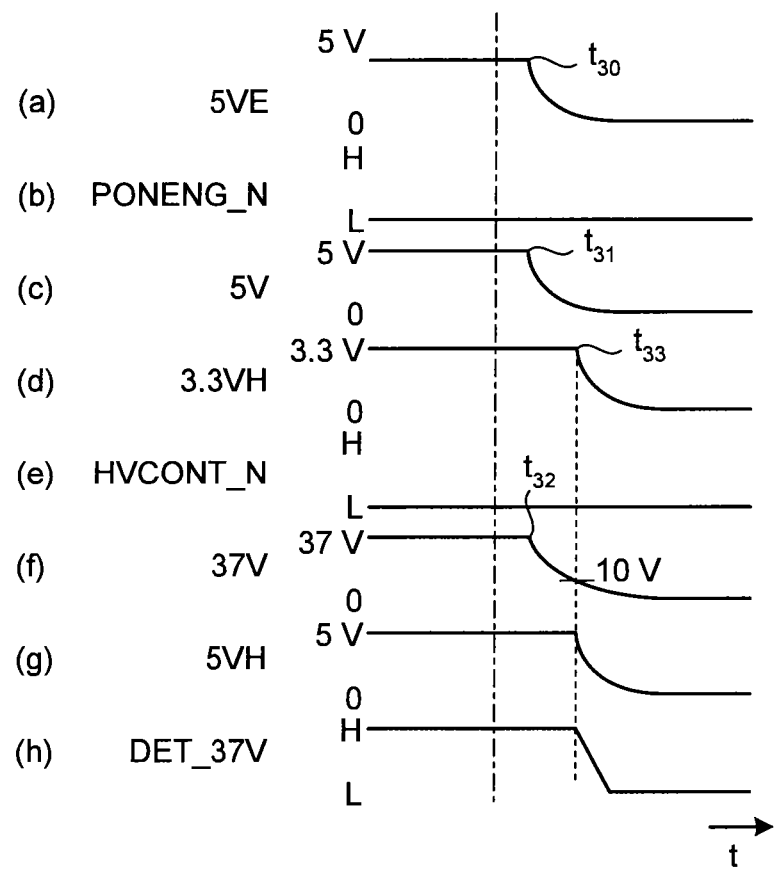

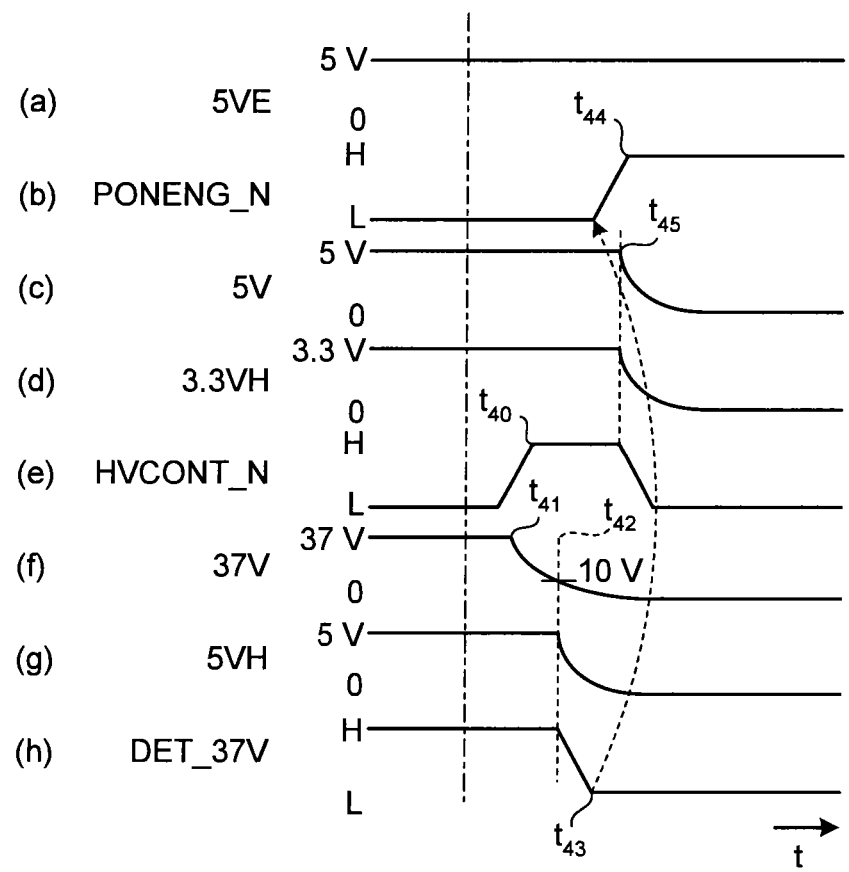

POWER SUPPLY DEVICE, POWER SUPPLY DEVICE CONTROL METHOD, AND IMAGE FORMING APPARATUS

CROSS-REFERENCE TO RELATED APPLICATIONS

The present application claims priority to and incorporates by reference the entire contents of Japanese Patent Application No. 2011-050685 filed in Japan on Mar. 8, 2011.

BACKGROUND OF THE INVENTION

1. Field of the Invention

The present invention relates to a power supply device that outputs multiple power supplies with different voltages, a power supply device control method, and an image forming apparatus.

2. Description of the Related Art

There are many conventional electronic devices that need multiple power supplies of different voltages. For example, an inkjet printer that ejects ink from a printer head and performs printing requires multiple power supplies of different voltages including a power supply with a first voltage to drive operational units including a display device, such as a liquid crystal display, and a motor; a power supply with a second voltage to drive the printer head; and a power supply with a third voltage to drive a logical circuit.

With such multiple power supplies at different voltages, there may be a limitation on the order in which the power is supplied. In this example, a case will be considered where a power supply device supplies a head driver integrated circuit (IC) to drive the printer head with a first power supply for the head driver IC and a second power supply, to drive the printer head, with a voltage much higher than that of the first power supply. In this case, if the supply of the second power supply to the head driver IC is continued even after the output of the first power supply to the head driver IC is stopped, the through current due to the second power supply flows through the head driver IC via the parasitic diode in the head driver IC, which may damage the head driver IC.

For this reason, conventional power supply devices are known that have a function of controlling when multiple power output circuits of different output voltages start or stop their outputs. For example, Japanese Patent No. 4279235 discloses a configuration that monitors the power supplied from an external power supply device by using a photocoupler and that controls when the power output circuit is stopped by using transistor switching and by using the length of time for which the capacitor discharges. The configuration according to Japanese Patent No. 4279235 can control, even if the supply of power from the external power supply device is cut out, when the multiple power output circuits stop their outputs such that they are stopped in a predetermined order.

Conventional power supply devices control when the output stops by using the time period for which the capacitor discharges in the power supply device and thus the power output of the power supply device ensures when the output stops. The capacitor connected to the circuit of a device supplied with power, such as a printer head driver circuit, is not taken into consideration. Thus, for example, when a capacitor with a large capacitance is connected to the printer head driver circuit, to which a power supply is supplied, to rectify the waveform, a problem occurs in that when the power supply device stops the output and when the output of the voltage of the device supplied with power is stopped might be different.

As an example, a case will be considered where a large-capacitance capacitor is connected to the above-described second power supply in the power-supplied device. In this case, even if the power supply device stops the first and second power outputs simultaneously, the supply of the second power supply is continued also after the supply of the first power supply is stopped due to the operation of the capacitor. Accordingly, there is a risk that the head driver IC might be damaged.

The above-described configuration of Japanese Patent No. 4279235 cannot solve the problem that, when a large-capacitance capacitor is connected to the circuit of the power-supplied device, the time point when the output of the power supply device stops and the time point when the power supply to the power-supplied device stops may be different from each other.

In order to avoid such a problem, a capacitor for the power supply device may be set in consideration of the capacitance of the capacitor connected to the printer head drive circuit. However, this case has a problem in that design freedom is narrowed.

The method of controlling when the output of the power supply is stopped by using the charging or discharging of the capacitor has a problem in that it is difficult, when an irregular operation is performed, e.g., when the power supply is turned off during charging, to cause a given time difference between the time points when the output of power supplies at different voltages stops.

As described above, conventional power supply devices have a problem that, when a power supply device is stopped, a power-supplied device cannot follow a power supply sequence specific to the device supplied with power, which might cause instability in the device operations or damage the device.

There is a need, when multiple power supplies of different voltages are supplied, to prevent unnecessary high-voltage supplies to a device being supplied with power when the power supply is stopped.

SUMMARY OF THE INVENTION

It is an object of the present invention to at least partially solve the problems in the conventional technology.

According to an embodiments, a power supply device includes: a first voltage generator that operates to output a first voltage; a second voltage generator that operates to output a second voltage higher than the first voltage; a third voltage generator that, from the second voltage generated by the second voltage generator, operates to generate a third voltage equal to the first voltage and to output the third voltage therefrom; and a selector that operates to select as an output whichever has a higher voltage from the output of the first generator and the output of the second generator, wherein each of the output of the second voltage generator and the output selected by the selector are supplied to a load.

According to another embodiment, a power supply device control method includes: first generating that includes operating to output a first voltage by a first voltage generator; second generating that includes operating to output a second voltage, by a second voltage generator, which is higher than the first voltage; third generating that includes operating to generate, by a third voltage generator, a third voltage equal to the first voltage from the second voltage generated at the second generating, and to output the third voltage; and selecting, by a selector, as an output whichever has a higher voltage out of the output at the first generating and the output at the second generating, wherein each of the output at the second generating and the output selected at the selecting are supplied to a load.

According to still another embodiment, an image forming apparatus includes: the power supply device mentioned above; a head to which the second voltage generated by the second voltage generator and the output selected by the selector are supplied as a power supply; and an image forming unit that forms an image using the head.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a schematic line diagram depicting an example of a power supply sequence during a normal operation according to the embodiment;

FIG. 8 is a schematic line diagram depicting an example of a power supply sequence during a normal operation according to the embodiment; and FIG. 9 is a schematic line diagram depicting an example of a power supply sequence during a normal operation according to the embodiment.

DETAILED DESCRIPTION OF THE PREFERRED EMBODIMENTS

Figure 1:
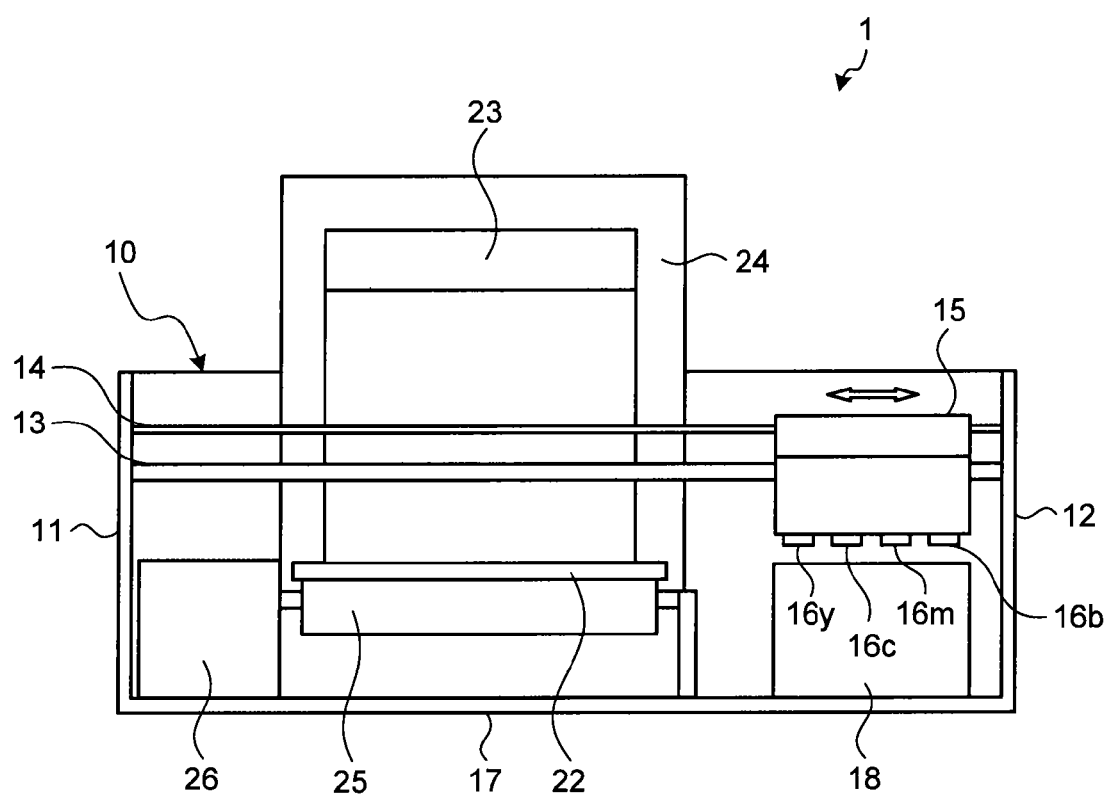
FIG. 1 is a front schematic line diagram of an exemplary configuration of an inkjet printer applicable to an embodiment.
Figure 2:
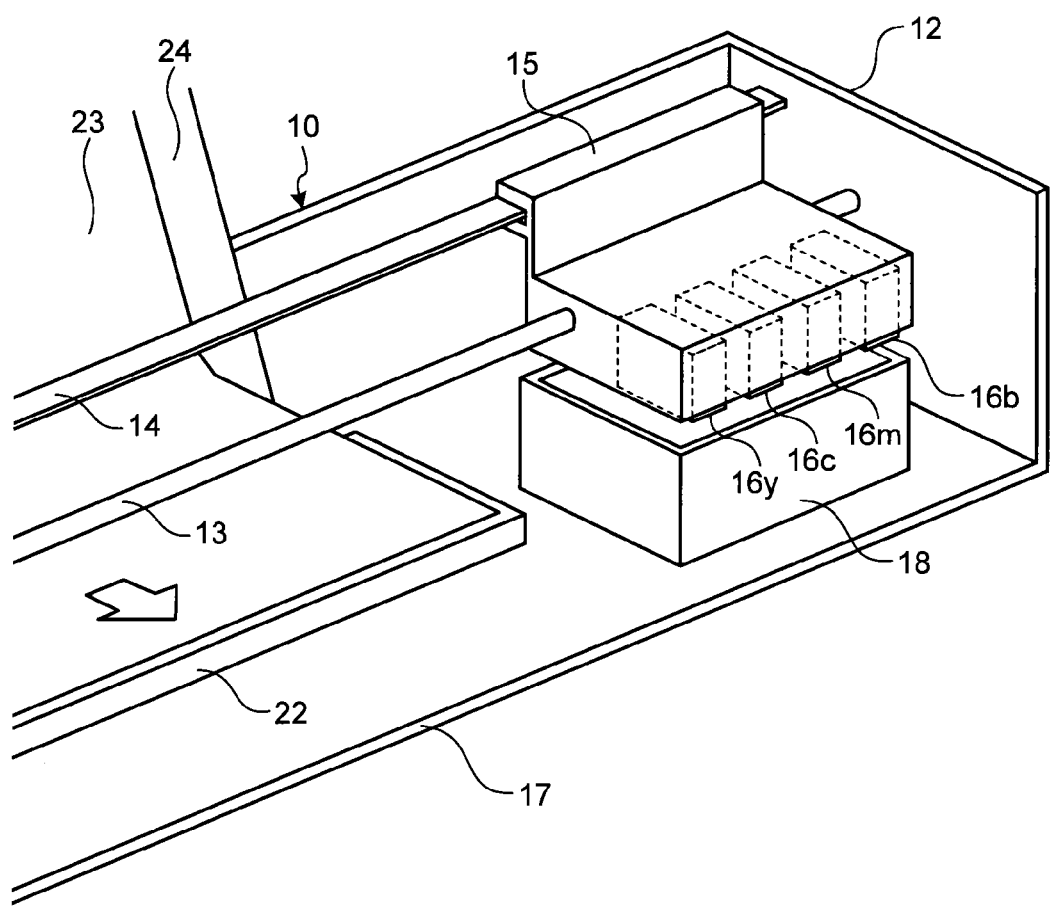
FIG. 2 is a schematic line diagram of an oblique projection of part of the inkjet printer applicable to the embodiment.

An embodiment of a power supply device, a power supply device control method, and an image forming apparatus using the power supply device will be described in detail below with reference to the accompanying drawings. FIG. 1 depicts a front view of an exemplary configuration of an inkjet printer 1 serving as an image forming apparatus applicable to the embodiment. FIG. 2 depicts a view in oblique projection of part of the inkjet printer 1.

As depicted in FIG. 1, a guide shaft 13 and a guide plate 14 are provided in parallel to bridge light and left side plates 11 and 12 of a casing 10 of the inkjet printer 1. The guide shaft 13 and the guide plate 14 penetrate through a carriage 15 so as to be slidable. An endless belt (not shown) is attached to the carriage 15. The endless belt is looped over a driven pulley and an undriven pulley (not shown) provided on the left and right in the casing 10. The undriven pulley is rotated in accordance with rotation of the driven pulley and thus the endless belt runs. Accordingly, the carriage 15 moves left and light as indicated by the arrow in FIG. 1.

Four color inkjet heads 16y, 16c, 16m, and 16b (if it is not required to specify which inkjet head, the four inkjet heads 16y, 16c, 16m, and 16b are represented by inkjet head 16) for the four colors yellow, cyan, magenta, and black are arranged in parallel in the carriage 15 along the direction in which the carriage 15 moves. Each inkjet head 16 includes a nozzle row in which multiple nozzles are linearly arranged on the downward-facing nozzle surface. Although not illustrated, the linear nozzle row is provided along the direction orthogonal to the direction in which the carriage 15 moves.

When the carriage 15 is in the home position on the right end as depicted in FIG. 1, each inkjet head 16 faces a single recovery device 18 provided on a bottom plate 17 in the casing 10. The single recovery device 18 recovers ink from a nozzle in which an ink ejection error is detected to allow the inkjet printer 1 to independently recover from the liquid ejection error.

A sheet feeding table 24 to feed a sheet 23, which is a recording medium, on a plate-like platen 22 is obliquely provided on the back of the platen 22. Although not illustrated, a sheet feeding roller to feed the sheet 23 on the sheet feeding table 24 onto the platen 22 is provided. Furthermore, a conveying roller 25 is provided that conveys the sheet 23 on the platen 22 in the direction represented by the arrow and ejects the sheet 23 to the front side.

A drive device 26 is further set on the left end on the bottom plate 17 in the casing 10. The drive device 26 drives the sheet feeding roller (not shown) and the conveying roller 25 and drives the driven pulley to run the endless belt so that the carriage 15 is moved.

When recording is performed, the sheet 23 is moved onto the platen 22 according to the rotation by the drive device 26 and is positioned to be at a predetermined position. The carriage 15 is then moved and scans the sheet 23 and, while moving left, ejects ink drops from the nozzles by using the four color inkjet heads 16y, 16c, 16m, and 16b, so that an image is recorded on the sheet 23. After the image is recorded, the carriage 15 is moved back rightward and the sheet 23 is conveyed in a predetermined distance in the direction represented by the arrow in FIG. 2.

While being moved left again, the carriage 15 then ejects ink drops from the nozzles sequentially by using the four color inkjet heads 16y, 16c, 16m, and 16b in the outward trip, so that an image is recorded on the sheet 23. After the image is recorded, the carriage 15 is moved back rightward and the sheet 23 is conveyed for a predetermined distance in the direction represented by the arrow in FIG. 2. The same operation is repeated to record images on the single sheet 23.

Figure 3:
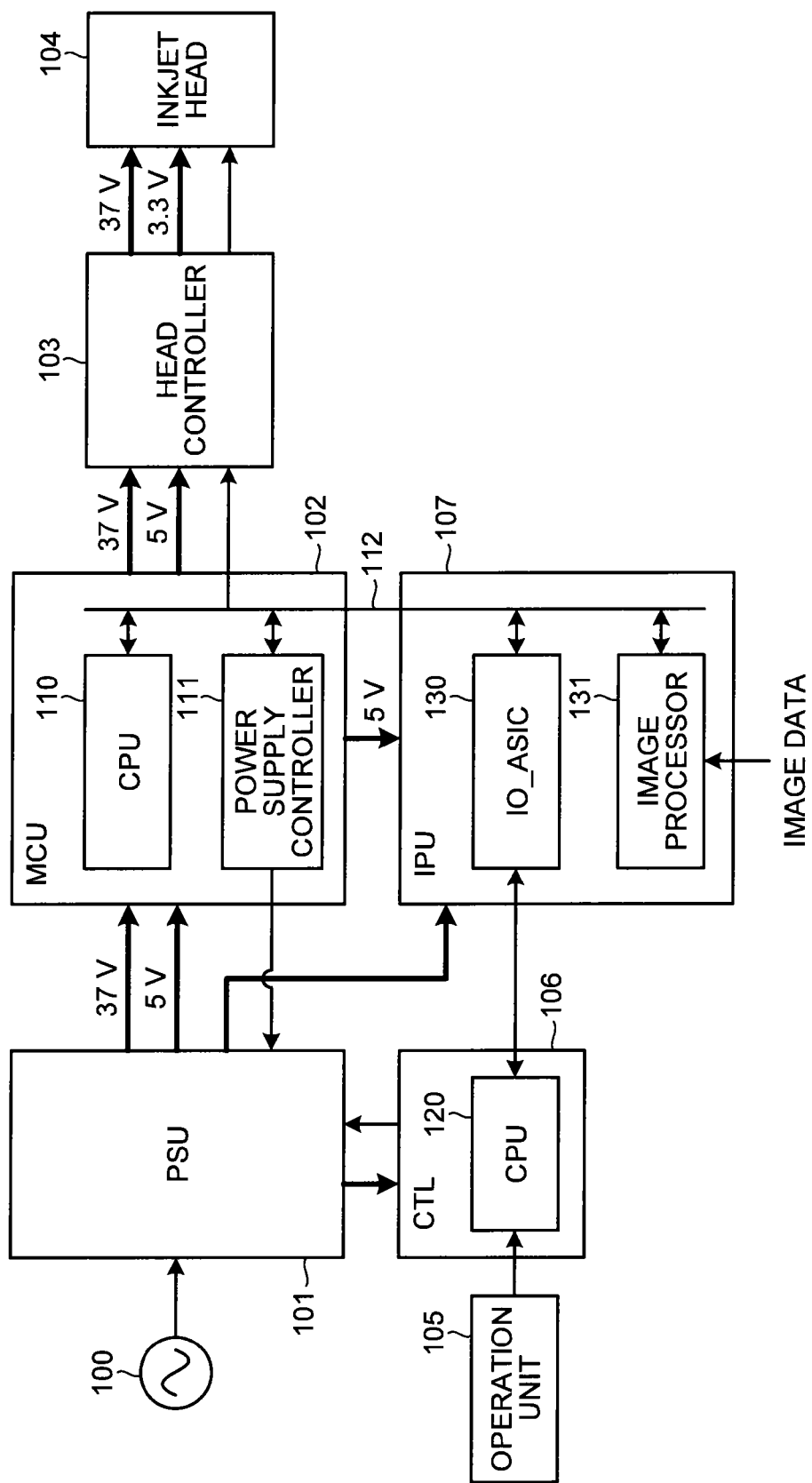
FIG. 3 is a block diagram schematically depicting an exemplary configuration of the inkjet printer applicable to the embodiment.

FIG. 3 schematically depicts an exemplary configuration of the inkjet printer 1 applicable to the embodiment. FIG. 3 does not illustrate parts not directly relating to the embodiment, such as the motor drive system. The inkjet printer 1 includes a power supply unit (PSU) 101, a main control unit (MCU) 102, a head controller 103, an inkjet head 104, an operation unit 105, a controller (CTL) 106, and an image processing unit (IPU) 107.

The PSU 101 outputs multiple power supplies with different voltages to each unit of the inkjet printer 1 from a commercial power supply 100. The MCU 102 includes a CPU 110 and a power supply controller 111. The CPU (central processing unit) 110 generates various control signals and controls the power supply controller 111 according to a program that is pre-stored in a ROM (not shown). The power supply controller 111 is configured from, for example, an ASIC (application specific integrated circuit). The power supply controller 111 generates some of the supplies of power supplied to the inkjet head 104 and controls the power output from the PSU 101.

The CTL 106 includes a CPU 120. The CTL 106 controls the power output from the PSU 101 according to the program pre-stored in the ROM (not shown) and controls entire operations of the inkjet printer 1 according to control signals from the operation unit 105. The operation unit 105 includes a display unit used as a display device, such as an LCD (liquid crystal display), and an operation unit for user operations. The operation unit 105 makes displays in accordance with display control signals generated by the CPU 120 and outputs control signals according to user operations and supplies the CPU 120 with the control signals.

The IPU 107 includes an image processor 131 and an IO_ASIC 130. The IPU 107 runs at a power supply with a voltage of 5 V, which is supplied from the MCU 102. The image processor 131 and the IO_ASIC 130 are communicably connected to the CPU 110 and the power supply controller 111 in the MCU 102 via a bus 112. The IO_ASIC 130 is configured from, for example, and ASIC. The IO_ASIC 130 is connected to the CPU 120 via a bus, such as a PCI (peripheral component interconnect) bus, and has a function of adjusting communications with the CPU 120 and the CPU 110 and communications of the image processor 131 via the bus 112. This allows the CPU 120 and the CPU 110 to communicate with each other.

The image processor 131 performs given image processing on image data supplied from an image data input unit (not shown).

The head controller 103 generates a power supply suitable for the inkjet head 104 from the power supply from the MCU 102 and supplies the inkjet head 104 with the generated power supply. The head controller 103 controls ink ejection performed by the inkjet head 104 in accordance with a head drive signal VCOM supplied from the power supply controller 111 and a control signal based on the image data processed by the image processor 131. The inkjet head 104 corresponds to the inkjet head 16 depicted in FIG. 1 and FIG. 2.

Figure 4:
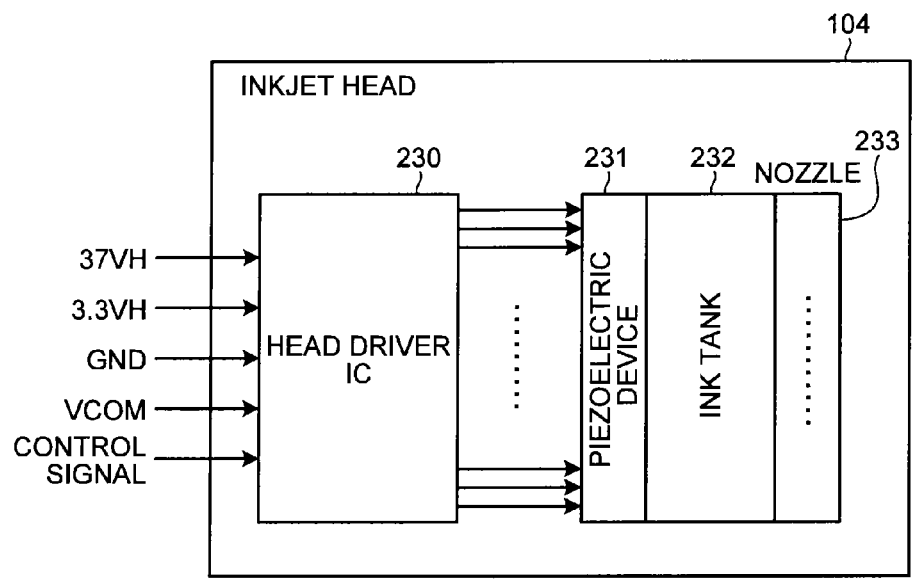
FIG. 4 is a block diagram of an exemplary configuration of an inkjet head.

FIG. 4 depicts an exemplary configuration of the inkjet head 104. In the example of FIG. 4, the inkjet head 104 includes a head driver IC (integrated circuit) 230 and includes a piezoelectric device 231, an ink tank 232 that stores ink, and a nozzle 233 to eject the ink. The piezoelectric device 231, the ink tank 232, and the nozzle 233 constitute the head body. In the head body, a high-frequency voltage is applied to the piezoelectric device 231 and the ink in the ink tank 232 is ejected from the nozzle 233 by using the fluctuation of the piezoelectric device 231 caused by the high-frequency voltage.

The head driver IC 230 is supplied with, for example, a power supply 3.3VH with a voltage of 3.3 V to drive the head driver IC 230 and a power supply 37VH with a voltage of 37 V to drive the piezoelectric device 231. The power supply voltage to drive the head driver IC 230 and the power supply voltage to drive the piezoelectric device 231 are merely examples and power supply voltages are not limited to them.

The head driver IC 230 is further supplied with a drive signal VCOM from which the drive waveform of the piezoelectric device 231 originates and with a control signal to control the head driver IC 230.

In general, the power supply voltage to drive the piezoelectric device 231 is a high-level voltage compared to the power supply voltage to drive the head driver IC 230. In contrast, if the head driver IC 230 is supplied with the power supply 37VH to drive the piezoelectric device 231 before being supplied with the power supply 3.3VH to drive the head driver IC 230, a through current flows due to the power supply 37VH via the parasitic diode in the head driver IC 230, which may damage the head driver IC 230. For this reason, it is necessary to supply the head driver IC 230 with the power supply 3.3VH and the power supply 37VH in accordance with a given sequence.

Figure 5:
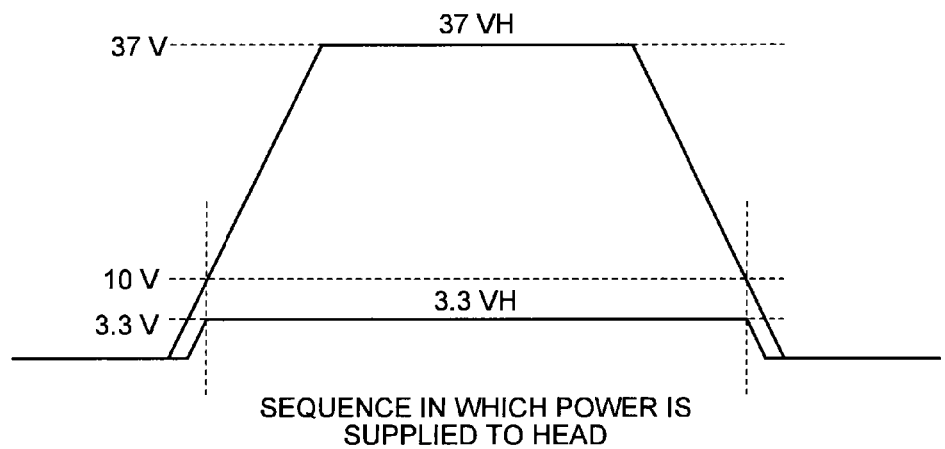
FIG. 5 is a schematic line diagram of an exemplary sequence in which power is supplied to the inkjet head.

FIG. 5 depicts an exemplary sequence of the power supply to be supplied to the inkjet head 104. Here, when the head driver IC 230 is not yet supplied with the power supply 3.3VH to drive the head driver IC 230 but is supplied with a power supply 37VH to drive the piezoelectric device 231, the voltage of the power supply 37VH with which the head driver IC 230 will not be damaged (safe voltage) is 10 V.

First, when the power of the inkjet printer 1 is turned on, e.g., when supplying the inkjet head 104 with the power supply 3.3VH and the power supply 37VH is started, it is required that the power supply 3.3VH rises to a specified voltage (3.3 V in this example) before the voltage of the power supply 37VH reaches the safe voltage. Furthermore, when the power of the inkjet printer 1 is turned off, e.g., supplying the inkjet head 104 with the power supply 3.3VH and the power supply 37VH is stopped, it is required that the power supply 3.3VH maintains the specified voltage until the voltage of the power supply 37VH decreases to the safe voltage.

Figure 6:
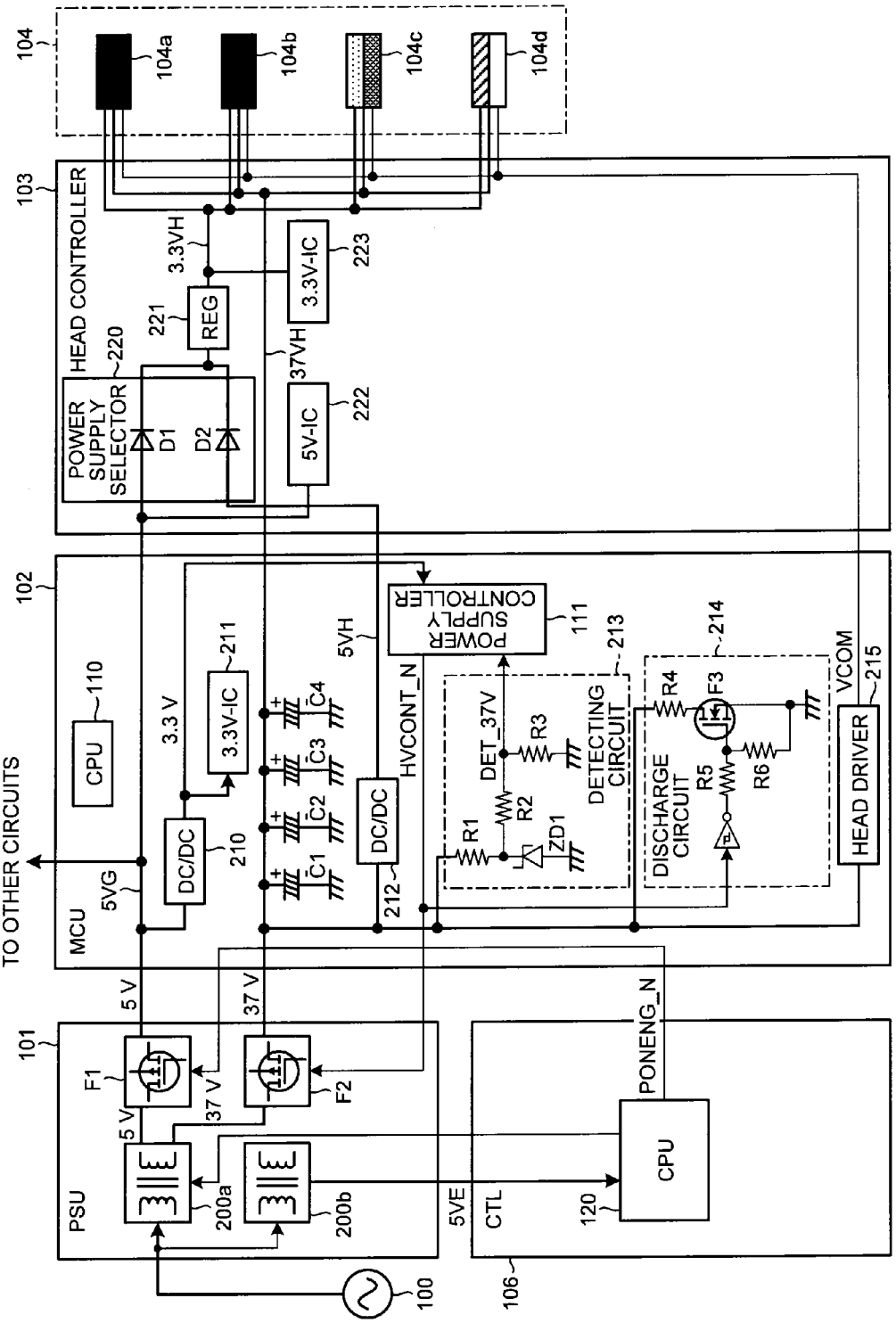
FIG. 6 is a circuit diagram depicting in detail an exemplary configuration of a PSU, an MCU, and a head controller according to the embodiment.

Operations of the embodiment will be described here in detail below using FIGS. 6 to 9. FIG. 6 depicts in detail an exemplary configuration of the PSU 101, the MCU 102, and the head controller 103 according to the embodiment. In FIG. 6, the components in common with those in FIG. 3 are denoted by the same reference numerals as those of FIG. 3 and detailed descriptions thereof will be omitted. FIG. 6 depicts routes and the configuration of the power supplies and power supply control closely related to the embodiment and thus omits other routes and configurations unless otherwise noted.

The configuration of the PSU 101 will be described first. The PSU 101 includes A/D conversion circuits 200a and 200b and switch devices F1 and F2. Each of the switch devices F1 and F2 is configured from a p-channel MOSFET (metal-oxide semiconductor field-effect transistor). When a low signal is input to the gate, the on state is kept between the source and drain.

Each of the A/D conversion circuits 200a and 200b includes a transformer, a rectifier and a stabilizer circuit. Each of the A/D conversion circuits 200a and 200b transforms, rectifies and stabilizes the commercial power supply externally supplied as an AC voltage of 100 V and then outputs the power. The A/D conversion circuit 200a generates a DC power supply with a voltage of 5 V and a DC power supply with a voltage of 37 V. The CPU 120 in the CTL 106 controls the on/off operations of the A/D conversion circuit 200a. The A/D conversion circuit 200b generates a DC power supply 5VE with a voltage 5 V to cause the CPU 120 in the CTL 106 to run.

The power supply with a voltage of 5 V generated by the A/D conversion circuit 200a is input to the drain of the switch device F1. The source output of the switch device F1 is supplied as a power supply 5VG to the MCU 102. A signal PONENG_N output from the CPU 120 in the CTL 106 is input to the gate of the switch device F1. The signal PONENG_N in a low state causes an on state between the source and drain of the switch device F1. The signal PONENG_N in a high state causes an off state between the source and drain of the switch device F1. In other words, when the signal PONENG_N is in a low state, the power supply 5VG with a voltage of 5 V is output from the switch device F1 and, when the signal PONENG_N is in a high state, the output of the power supply is stopped. The signal PONENG_N with a voltage of 0 V when in the low state.

The power supply with a voltage of 37 V, which is generated by the A/D conversion circuit 200a, is input to the drain of the switch device F2. The source output of the switch device F2 is supplied as the power supply 37VH to the MCU 102. A signal HVCONT_N output from the power supply controller 111 in the MCU 102 is input to the gate of the switch device F2. The signal HVCONT_N in a low state causes an on state between the source and drain of the switch device F2. The signal HVCONT_N in a high state causes an off state between the source and drain of the switch device F2. In other words, when the signal HVCONT_N is in a low state, the power supply 37VH with a voltage of 37 V is output from the switch device F2 and, when the signal HVCONT_N is in a high state, the output of the power supply is stopped. The signal HVCONT_N when in a low state has a voltage of 0 V.

The configuration of the MCU 102 will be described here. The MCU 102 includes the power supply controller 111 and the CPU 110 and includes DC/DC converters 210 and 212, a detecting circuit 213, a discharge circuit 214, and a head driver 215. The power supply 5VG supplied from the PSU 101 to the MCU 102 is output from the MCU 102, supplied to the head controller 103, and supplied to other circuits, such as the IPU 107 (see FIG. 3). In other words, the power supply 5VG is a power supply that is commonly used as the power supply with a voltage of 5 V in the inkjet printer 1.

The power supply 5VG is further input to the DC/DC converter 210. The DC/DC converter 210 converts the voltage of the supplied power supply 5VG to, for example, 3.3 V and then outputs the power supply. The output of the DC/DC converter 210 is supplied as a power supply to the power supply controller 111 and supplied to other ICs (3.3V-IC) 211 that require a power supply with a voltage of 3.3 V.

The conversion and output by the DC/DC converter 210 is not limited to the power supply of 3.3 V. It can be a value corresponding to a power supply voltage required by the device to which the power supply is supplied. In this case, if the power supply voltage required by the device to which the power supply from the DC/DC converter 210 is supplied is equal to the voltage of the input of the DC/DC converter 210, the DC/DC converter 210 can be eliminated.

The power supply 37VH supplied from the PSU 101 to the MCU 102 is supplied to the DC/DC converter 212, the detecting circuit 213, the discharge circuit 214, and the head driver 215 in the MCU 102. The power supply 37VH is output from the MCU 102 and supplied as the power supply 37VH to each inkjet head 104 via the head controller 103.

The head driver 215 generates a drive waveform for the head from the supplied power supply 37VH and outputs the drive waveform as the head drive signal VCOM from the MCU 102. The capacitors C1 to C4 connected to the power supply 37VH are large-capacitance capacitors used in order to stably output the head drive signal VCOM from the head driver 215.

The DC/DC converter 212 converts the voltage of the power supply 37VH to a power supply 5VH of a voltage (5V in this case) equal to that of the power supply 5VG and outputs the power supply 5VH. The power supply 5VH is supplied to the head controller 103. For the DC/DC converter 212, the minimum value of an input voltage range in which a specified output voltage (5V) can be output (hereinafter, "input-voltage-range minimum value") is equal to or less than the safe voltage (10 V in this case) of the head driver IC 230 in the inkjet head 104.

The detecting circuit 213 monitors the voltage of the supplied power supply 37VH and detects whether the voltage of the power supply 37VH is less than a predetermined voltage. In the example in FIG. 6, the power supply 37VH is supplied to the cathode of a Zener diode ZD1 via a resistor device R1 in the detecting circuit 213. The voltage extracted from the middle point between the resistor device R1 and the cathode of the Zener diode ZD1 is divided into half the voltage by resistor devices R2 and R3 and the divided voltage is then input to the analog port of the power supply controller 111. The power supply controller 111 can detect the voltage input to the analog port.

Regarding the Zener diode ZD1, a voltage approximately equal to the safe voltage of the head driver IC 230 is selected for a Zener voltage. When the voltage of the power supply 37VH is equal to or more than the safe voltage, the voltage of the cathode of the Zener diode ZD1 is equal to the Zener voltage, i.e., safe voltage. When the voltage of the power supply 37VH is less than the safe voltage, the voltage of the cathode of the Zener diode ZD1 is less than the Zener voltage. The power supply controller 111 monitors the voltage of the cathode of the Zener diode ZD1 and detects whether the power supply 37VH is less than the safe voltage. In practice, the power supply controller 111 monitors the voltage obtained by dividing the voltage of the cathodes by the resistor devices R2 and R3.

When the switching device F2 stops the output of the power supply 37VH, the discharge circuit 214 discharges the supplied power supply 37VH. A signal HVCONT_N output from the power supply controller 111 is inverted by the inverter and input to the gate of the switch device F3, which is configured from an n-channel MOSFET, via a resistor device R5. The power supply 37VH is input to the drain of the switch device F3 via a resistor device R4. The source of the switch device F3 is grounded. The middle point between the resistor device R5 and the gate of the switch device F3 is grounded via the resistor device R6. When the signal HVCONT_N enters a high state and the output of the power supply 37VH from the PSU 101 is stopped, the gate of the switch device F3 enters a low state and thus the switch device F3 enters an on state and the power supply 37VH is discharged via the drain-source between the resistor device R4 and the switch device F3.

The discharge circuit 214 forces, when the output of the power supply 37VH is stopped, discharge of electrons stored in the capacitors C1 to C4 connected to the route of the power supply 37VH, which accelerates the decrease of the voltage of the power supply 37VH. Even outside the MCU 102, even if the large-capacitance capacitor is connected to the route of the power supply 37VH, the voltage reduction is similarly accelerated.

The configuration of the head controller 103 will be described here. The head controller 103 includes a power supply selector 220 and a regulator (REG) 221. The power supply selector 220 includes a first selection input end and a second selection input end. The power supply selector 220 selects as a power supply whichever has a higher voltage from the power supplies input to the first and second selection input ends and outputs the selected power supply. In the example in FIG. 6, the power supply selector 220 includes two diodes D1 and D2. The anode of the diode D1 is the first selection input end and the anode of the diode D2 is the second selection input end. The cathodes of the diodes D1 and D2 are connected and the output of the power supply selector 220 is extracted from the connecting point.

In the power supply selector 220, the power supply 5VG is input to the first selection input end and the power supply 5VH is input to the second selection input end. The power supply selector 220 selectively outputs as a power supply whichever has a higher voltage from the power supply 5VG and the power supply 5VH.

The output of the power supply selector 220 is supplied to the regulator 221. The regulator 221 stabilizes the supplied power supply at a power supply of a given voltage (for example, 3.3 V) and then outputs the stabilized power supply. The output of the regulator 221 is input to the inkjet head 104 and supplied as a power supply 3.3VH to the head driver IC 230.

The power supply with a voltage of 5 V to be input to the first selection input end of the power supply selector 220 is also supplied to each 5V-IC 222 that requires a voltage of 5 V as a power supply in the head controller 103. Similarly, the output of the power supply selector 220 is supplied to each 3.3V-IC 223 that requires a voltage of 3.3 V as a power supply. Each 5V-IC 222 and each 3.3V-IC 223 include a controller that controls, for example, a sensor that performs detection regarding head operations.

The power supply 37VH and the power supply 3.3VH are supplied to an inkjet heads 104a, 104b, 104c and 104d of the respective colors. Similarly, the drive signal VCOM output from the head driver 215 in the MCU 102 is supplied to each of the inkjet heads 104a to 104d of the respective color. Although not illustrated, control signals based on the image data output from the image processor 131 are supplied to the inkjet heads 104a to 104d of the respective color. In accordance with each power supply, driver signal VCOM and control signal, each of the inkjet heads 104a to 104d ejects ink.

The power supply sequence according to the embodiment will be described using FIG. 6 and FIGS. 7 to 9. First, the power supply sequence during the normal operation will be described using FIG. 7. In FIG. 7, (*a*) depicts the power supply 5VE; (*b*) depicts the signal PONENG_N; (*c*) depicts the power supply 5VG (5 V); (*d*) depicts the output (3.3 V) of the DC/DC converter 210; and (*e*) depicts the power supply 3.3VH. In FIG. 7, (*f*) depicts the signal HVCONT_N; (*g*) depicts the power supply 37VH (37 V); (*h*) depicts the power supply 5VH; and (*i*) depicts the input voltage (DET 37V) to the analog port of the power supply controller 111.

An example of operations when the power is turned on will be described here. For example, if the main switch (not shown) of the inkjet printer 1 is turned on, the A/D conversion circuit 200b in the PSU 101 generates the power supply 5VE from the commercial power supply 100 in order to start the CPU 120 in the CTL 106.

In the PSU 101, along with the generation of the power supply 5VE, the A/D conversion circuit 200a generates the power supplies of voltages 37 V and 35 V from the commercial power supply 100 and the power supplies are supplied to the switch devices F1 and F2, respectively. Because the signal PONNENG_N is in a low state when the power is on, the power supply 5VG rises at a time $t_1$ and accordingly the voltage 3.3 V of the DC/DC converter 210 rises. The rise of the power supply 5VG causes the power supply 3.3VH of the output of the power supply selector 220 to rise.

When the voltage 3.3 V of the output of the DC/DC converter 210 rises, the power supply controller 111 in the MCU 102 is started. When the power supply controller 111 is started, it shifts the signal HVCONT_N from the low state to the high state. This turns the switching device F2 to an off state and thus the output of the power supply 37VH is stopped. For example, at a time point $t_2$ after a predetermined time from the start, the power supply controller 111 shifts the signal HVCONT_N from a high state to a low state. Accordingly, the switching device F2 enters an on state and thus the power supply 37VH rises. In accordance with the rise of the power supply 37VH, the power supply 5VH of the output of the DC/DC converter 212 rises.

In accordance with the rise of the power supply 37VH, a voltage DET_37V input to the analog port of the power supply controller 111 increases. When the voltage DET_37V reaches the Zener voltage (for example, 10 V) of the Zener diode ZD1 (time point $t_3$), it remains at the Zener voltage. Accordingly, the power supply controller 111 can detect that the power supply 37VH is equal to or greater than the safe voltage of the head driver IC 230 in the inkjet head 104.

During the initial operation and a normal operation (during print operation) after the power is turned on, each power supply and signal (signal PONENG_N, signal HVCONT_N and voltage DET_37V) does not change.

The operations during the standby state will be described here. The inkjet printer 1 shifts to the standby state when, for example, a given time has passed after a user operation on the operation unit 105 or a print operation ends. In the standby state, each inkjet head 104 is capped to prevent it from drying out and thus not able to eject ink. In contrast, in the standby state, the head driver IC 230 and the IPU 107 are in the operating state.

When each inkjet head 104 is capped, each inkjet head 104 cannot be driven, i.e., cannot eject ink. Thus, for example, at the time point $t_1$, the power supply controller 111 shifts the signal HVCONT_N from the low state to the high state and turns the switch device F2 to the off state to stop the output of the power supply 37VH (time point $t_1$). Because the electric charges stored in the capacitors C1 to C4 are discharged, the output voltage of the switch device F2 gradually reduces. The operation of the discharge circuit 214 allows discharge of the power supply 37VH in a relatively short time.

After the output of the power supply 37VH is stopped, the DC/DC converter 212 maintains the output of the specified voltage 5V until the input voltage becomes lower than the minimum value in the input voltage range of the DC/DC converter 212 (safe voltage of the head driver IC 230). At the time point $t_{12}$, when the input voltage becomes lower than the minimum value in the input voltage range, the voltage of the power supply 5VH output from the DC/DC converter 212 drops from the specified voltage of 5 V. Here, because the first selection input end of the power supply selector 220 in the head controller 103 is supplied with the power supply 5VG with a voltage of 5 V, the power supply 5VG is selectively output from the power supply selector 220 after the voltage drop of the power supply 5VH, so that the output voltage of 5 V is maintained.

In the detecting circuit 213, when the power supply 37VH becomes lower than the Zener voltage of the Zener diode ZD1 (the safe voltage of the head driver IC 230), the signal DET_37V is shifted from a high state to a low state.

Operations in the power saving mode will be described here. For example, when a predetermined time has passed after a user operation of the operation unit 105 or since entering the standby state, the inkjet printer 1 shifts to the power saving mode. In the power saving mode, only the power supply 5VE to the CPU 120 in the CTL 106 rises in the inkjet printer 1.

For example, in accordance with an operation of the operation unit 105 instructing a shift to the power saving mode to take place, the CPU 120 shifts the A/D conversion circuit 200a in the PSU 101 to an off state to stop generation of voltages of 37 V and 5 V and shifts the signal PONENG_N from a low state to a high state (time $t_{15}$). Accordingly, the output of the power supply 5VG is stopped, the power supply of the voltage 3.3 V to be supplied to the power supply controller 111 is stopped, and the signal HVCONT_N output from the power supply controller 111 enters a low state. Because both the outputs of the power supply 5VG and the power supply 5VH are stopped, the output of the power supply 3.3VH is also stopped.

The above-described operations ensure that, when the power is on, the inkjet head 104 is supplied with the power supply 3.3VH before or simultaneously supplied with the power supply 37VH. Because, when the power is turned off, the output of the power supply 37VH is stopped when the standby state takes place, it is ensured that the output of the power supply 3.3VH is stopped after the output of the power supply 37VH is stopped. Accordingly, the sequence of power supply to the inkjet head is correctly followed, which prevents the head driver IC 230 from being damaged due to a high voltage. In addition, because the output of the power supply 37VH is stopped in the standby state, power saving effects can be obtained.

The power supply sequence during an abnormal operation will be described here. FIG. 8 depicts an example of a power supply sequence in which, during an initial operation or an operation, the main switch enters an off state or the plug of the inkjet printer 1 is pulled out and thus the power is turned off. In FIG. 8, (a) depicts the power supply 5VE; (b) depicts the signal PONENG_N; (c) depicts the power supply 5VG (5V); (d) depicts the output (3.3 V) of the DC/DC converter 210; (e) depicts the signal HVCONT_N; (f) depicts the power supply 37VH (37V); (g) depicts the power supply 5VH; and (h) depicts the input voltage (DET__37V) to the analog port of the power supply controller 111.

When the main switch enters the off state during an initial operation or a normal operation or when the plug to supply the commercial power supply 100 happens to become disconnected, the supply of the commercial power supply 100 is terminated and accordingly all the power supply voltages in the inkjet printer 1 start dropping. In the example of FIG. 8, when the main switch enters an off state at the time point $t_{30}$, the voltages of the power supply 5VE, the power supply 5VG and the power supply 37VH output from the PSU 101 starts dropping as depicted in (a), (c) and (f), respectively. Thus, the CPU 120 and the power supply controller 111 running with the power supply 5VE and the power supply 5VG stop their operations and each of the signal PONENG_N and the signal HVCONT_N enters a low state.

Due to the effects of discharge from the large-capacitance capacitors C1 to C4, the time required to completely stop the output of the power supply 37VH is longer than the time to stop the output of the power supply 5VH. The voltage of the output of the power supply 37VH due to the discharge is converted to 5 V by the DC/DC converter 212 and then is output as the power supply 5VH. As described above, the minimum value in the input voltage range for the DC/DC converter 212 is equal to or less than the safe voltage of the head driver IC 230. Because the power supply selector 220 selects as a power supply whichever has a higher voltage from the power supplies input to the first and second selection input ends and outputs the selected power supply, the power supply 5VH output from the DC/DC converter 212 is selected and output when the supply of the commercial power supply 100 is being terminated. For this reason, after the power supply 37VH decreases to a safe voltage, the output of the power supply 3.3VH from the regulator 221 is stopped, which prevents the head driver IC 230 from being damaged.

Also in this case, because the discharge circuit 214 shorten the discharge time of the capacitors C1 to C4, all goes well even if the time to switch the main switch from an off state to an on state is short.

Next, a power supply sequence will be described in which the operation mode is forced to switch to the power saving mode in an initial operation or a normal operation. For example, the operation mode of the inkjet printer 1 can be shifted to the power saving mode by a user operation of the operation unit 105, performed during, for example, an initial operation or a normal operation in order for an instruction to be given for a shift to the power saving mode.

FIG. 9 depicts an example of a power supply sequence in which the operation mode is forcibly shifted to the power saving mode during an initial operation or a normal operation. Regarding FIG. 9, like FIG. 8, in FIG. 9, (a) to (h) depict the power supply 5VE, the signal PONENG_N, the power supply 5VG (5V), the output (3.3 V) of the DC/DC converter 210, the signal HVCONT_N, the power supply 37VH (37V), the power supply 5VH, and the input voltage (DET__37V) to the analog port of the power supply controller 111, respectively.

The instruction for a shift to the power saving mode made by a user operation of the operation unit 105 is transmitted from the CPU 120 to the CPU 110 in the MCU 102 via the IO_ASIC 130 and the bus 112. In accordance with the instruction, the CPU 110 instructs the power supply controller 111 to shift the signal HVCONT_N from a low state to a high state. As described using FIG. 7, the signal HVCONT_N and the signal PONENG_N are in a low state during the initial operation and the normal operation.

In accordance with the instruction from the CPU 110, the power supply controller 111 shifts the signal HVCONT_N to a high state (time point $t_{40}$). When the signal HVCONT_N enters a high state, the switch device F2 enters an off state, the power supply 37VH, which is the output of the switch device F2, is stopped (time point $t_{41}$), and the voltage of the power supply 37VH gradually decreases from 37 V.

When the voltage of the power supply 37VH becomes lower than a safe voltage (10 V in this case) of the head driver IC 230 (time point $t_{42}$), the voltage of the power supply 5VH, which is the output of the DC/DC converter 212, starts decreasing from the specified 5 V. At the time point $t_{42}$, the switch device F1 is in an on state and the voltage of the power supply 5VG is 5 V. Thus, the power supply selector 220 selects the output of the power supply 5VG. The output voltage of the power supply selector 220 is converted to a voltage of 3.3 V by the regulator 221 and is then supplied as the power supply 3.3VH to the inkjet head 104.

In contrast, when the voltage of the power supply 5VH starts decreasing from the specified 5V, the voltage of the signal DET__37V output from the detecting circuit 213 starts decreasing from the voltage based on the Zener voltage of the Zener diode ZD1 and the power supply controller 111 detects that the voltage of the power supply 37VH becomes equal to or less than the safe voltage (time point $t_{43}$). The power supply controller 111 transmits the detection result representing that the voltage of the power supply 37VH becomes equal to or less than the safe voltage to the CPU 120 of the CTL 106.

The CPU 120 receives the detection result transmitted from the power supply controller 111 and the CPU 120 controls the A/D conversion circuit 200a in the PSU 101 such that it enters an off state and shifts the signal PONENG_N from a low state to a high state (time point $t_{44}$). Accordingly, the output of the switch device F1 is stopped and the voltage of the power supply 5VG decreases (time point $t_{45}$) and accordingly the signal HVCONT_N output from the power supply controller 111 enters a low state and the output of the power supply 3.3VH from the regulator 221 is stopped.

The above-described operations cause only the power supply 5VE to rise. As described above, because the power supply 3.3VH is stopped after the power supply 37VH decreases to the safe voltage even during an abnormal operation of a forcible shift to the power saving mode in accordance with a user operation of the operation unit 105 during an initial operation or an operation, the head driver IC 230 can be prevented from being damaged.

As described above, in the embodiment, the power supply 3.3VH to drive the head driver IC 230 is generated from the power supply 37VH. Thus, after the power supply 37VH decreases to the safe voltage, the output of the power supply 3.3VH from the regulator 221 is stopped, which prevents the head driver IC 230 in the inkjet head 104 from being damaged.

Furthermore, because the power supply 3.3VH is generated from the power supply 37VH, the power supply sequence in the head driver IC 230 when the power supply stops can be satisfied irrespective of the capacitance of the capacitor in the PSU 101 and the capacitance of the capacitors C1 to C4 in the MCU 102.

In the embodiment, when multiple power supplies of different voltages are supplied, unnecessary high-voltage supplies to a device supplied with power are prevented when the power supply is stopped.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device, comprising:
    a first voltage generator that operates to output a first voltage;
    a second voltage generator that operates to output a second voltage higher than the first voltage;
    a third voltage generator that, from the second voltage generated by the second voltage generator, operates to generate a third voltage equal to the first voltage and to output the third voltage therefrom; and
    a selector that selects as an output whichever has a higher voltage from the output of the first generator and the output of the third generator,
    wherein each of the output of the second voltage generator and the output selected by the selector are supplied to a load.

2. The power supply device according to claim 1, further comprising
    a controller that causes the second voltage generator to start to operate when the first voltage is output from the first voltage generator.

3. The power supply device according to claim 2, further comprising
    a detector that detects whether the output of the second voltage generator is equal to or less than a predetermined voltage,
    wherein the controller stops the output of the first voltage generator when the detector detects that the output of the second voltage generator is equal to or less than the predetermined voltage.

4. The power supply device according to claim 3, wherein the predetermined voltage is a minimum voltage, among an input voltage range of the third voltage generating unit, with which the third voltage is output.

5. The power supply device according to claim 3, wherein the predetermined voltage is equal to or less than a safe voltage for a load to which the output of the selector is supplied.

6. The power supply device according to claim 1, further comprising a discharger that, when the output of the second voltage generator is stopped, discharges the output.

7. An image forming apparatus comprising:
    the power supply device according to claim 1;
    a head to which the second voltage generated by the second voltage generator and the output selected by the selector are supplied as a power supply; and
    an image forming unit that forms an image using the head.

8. A power supply device control method, comprising:
    first generating that includes operating to output a first voltage by a first voltage generator;
    second generating that includes operating to output a second voltage, by a second voltage generator, which is higher than the first voltage;
    third generating that includes operating to generate, by a third voltage generator, a third voltage equal to the first voltage from the second voltage generated at the second generating, and to output the third voltage; and
    selecting, by a selector, as an output whichever has a higher voltage out of the output at the first generating and the output at the third generating,
    wherein each of the output at the second generating and the output selected at the selecting is supplied to a load.

* * * * *